US009223946B1

(12) United States Patent
Circenis et al.

(10) Patent No.: US 9,223,946 B1
(45) Date of Patent: Dec. 29, 2015

(54) SPECIFICATION AND CONFIGURATION OF MANAGEMENT INTENT

(75) Inventors: Edgar Circenis, Loveland, CO (US); Bryan Joseph Jacquot, Mitchell, SD (US); Toran K. Kopren, Fort Collins, CO (US); Kathleen L. Gannon, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 527 days.

(21) Appl. No.: 12/588,845

(22) Filed: Oct. 29, 2009

(51) Int. Cl.
*G06F 21/12* (2013.01)
*G06F 9/44* (2006.01)

(52) U.S. Cl.
CPC ............... *G06F 21/128* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 5,933,646 A * | 8/1999 | Hendrickson ............. | G06F 8/71 713/100 |
| 6,601,095 B1 * | 7/2003 | Duffield et al. ............... | 709/222 |
| 7,222,367 B2 * | 5/2007 | Behr ..................... | G06F 21/105 380/201 |
| 7,356,679 B1 * | 4/2008 | Le et al. ............................. | 713/1 |
| 7,779,112 B2 * | 8/2010 | Herrmann et al. ............. | 709/224 |
| 2003/0200061 A1 * | 10/2003 | Yamanaka .......... | G06F 9/44526 702/188 |
| 2004/0083474 A1 * | 4/2004 | McKinlay ................. | G06F 8/61 717/176 |
| 2004/0177352 A1 * | 9/2004 | Narayanaswamy et al. ......................... | G06F 8/61 717/169 |
| 2005/0033794 A1 * | 2/2005 | Aridor .................... | H04L 29/06 709/200 |
| 2005/0044016 A1 * | 2/2005 | Irwin ....................... | G06F 21/10 705/30 |
| 2005/0125509 A1 * | 6/2005 | Ramachandran ......... | G06F 8/61 709/220 |
| 2005/0144616 A1 * | 6/2005 | Hammond ................ | G06F 8/65 717/173 |
| 2005/0149712 A1 * | 7/2005 | Martinez ............. | G06F 9/44505 713/1 |
| 2006/0026591 A1 * | 2/2006 | Backhouse ......... | G06F 9/44526 717/177 |
| 2006/0218563 A1 * | 9/2006 | Grinstein .................. | G06F 8/20 719/328 |
| 2007/0180444 A1 * | 8/2007 | Hoover ............... | G06F 9/44505 717/168 |
| 2007/0185814 A1 * | 8/2007 | Boccon-Gibod ....... | G06F 21/10 705/51 |
| 2007/0283344 A1 * | 12/2007 | Apte ......................... | G06F 8/61 717/174 |
| 2008/0071728 A1 * | 3/2008 | Lim ................................ | 707/1 |
| 2008/0134348 A1 * | 6/2008 | Gunyakti ................ | G06F 21/10 726/30 |
| 2008/0215558 A1 * | 9/2008 | Marinelli et al. ................. | 707/4 |
| 2008/0313331 A1 * | 12/2008 | Boykin et al. ................ | 709/226 |
| 2009/0158438 A1 * | 6/2009 | Pichetti ................... | G06F 21/10 726/26 |
| 2009/0205012 A1 * | 8/2009 | Jain et al. .......................... | 726/1 |
| 2009/0205040 A1 * | 8/2009 | Zunke .................... | G06F 21/10 726/14 |

(Continued)

*Primary Examiner* — Greg B Bengzon
(74) *Attorney, Agent, or Firm* — Andrews Kurth LLP

(57) ABSTRACT

A method, and a corresponding system, provide for configuring nodes in a computer system according to a user's intent. The computer system includes one or more nodes. The method includes receiving a configuration command from a user, including an identification of one or more of the nodes to be configured; determining available programs for configuring the one or more nodes; determining requirements for applying the available programs to the one or more nodes and displaying the requirements to the user for selection; receiving user selections from the displayed requirements; and executing the requirements to configure the one or more nodes.

20 Claims, 5 Drawing Sheets

(56) References Cited

U.S. PATENT DOCUMENTS

| | | | |
|---|---|---|---|
| 2009/0217306 A1* | 8/2009 | Wusthoff | G06F 9/44526 719/327 |
| 2009/0228984 A1* | 9/2009 | Sterin | 726/26 |
| 2009/0249488 A1* | 10/2009 | Robinson et al. | 726/26 |
| 2009/0276770 A1* | 11/2009 | Taieb | G06F 9/44526 717/177 |
| 2009/0282401 A1* | 11/2009 | Todorova | G06F 8/61 717/175 |
| 2010/0071069 A1* | 3/2010 | Sugiura | G06F 21/608 726/26 |
| 2010/0131618 A1* | 5/2010 | Brewis | H04L 41/0806 709/220 |
| 2010/0131619 A1* | 5/2010 | Brewis | H04L 41/0806 709/220 |
| 2010/0131652 A1* | 5/2010 | Brewis | H04L 41/0879 709/227 |
| 2010/0223287 A1* | 9/2010 | Lim | 707/769 |
| 2010/0281456 A1* | 11/2010 | Eizenman et al. | 717/104 |
| 2010/0332630 A1* | 12/2010 | Harlow | 709/221 |
| 2010/0332633 A1* | 12/2010 | Keys | G06F 8/68 709/223 |
| 2010/0333080 A1* | 12/2010 | Keys | G06F 8/68 717/171 |
| 2011/0030066 A1* | 2/2011 | Nakazawa | 726/26 |
| 2011/0099283 A1* | 4/2011 | Park | G06F 8/65 709/230 |

* cited by examiner

SPECIFICATION AND CONFIGURATION OF MANAGEMENT INTENT

BACKGROUND

In managing any computer system (a managed system), a user or administrator faces many challenges, including a myriad of licensed software and hardware components. Management software may have dependencies on agent software being installed on a managed node as a prerequisite for fully configuring the node. Management software also may be dependent on correct and sequential execution of the software configuration processes and on the correct configuration of existing management software. Finally, management software is prone to installation errors and even so usually requires technical support for installation. To obtain a fully functional management system, administrators often have to deal with complex requirements, voluminous documentation, and other issues across a number of software and hardware products. These products have to be understood, installed, and operated correctly and in the correct sequence. These requirements place demands on system administrators, who may know only what their system is intended, or desired to do, but are unaware of how to implement that intent.

SUMMARY

A method and a system that provide for configuring nodes in a computer system according to a user's intent. The computer system includes one or more nodes. The system also includes means for receiving a configuration command from a user, including an identification of one or more of the nodes to be configured, means for determining available programs for configuring the one or more nodes, means for determining requirements for applying the available programs to the one or more nodes and displaying the requirements to the user for selection, means for receiving user selections from the displayed requirements, and means for executing the requirements to configure the one or more nodes. The system may be implemented as a management server with user interface, core, discovery, license manager, and plug-in interface components.

The method includes receiving a configuration command from a user, including an identification of one or more of the nodes to be configured; determining available programs for configuring the one or more nodes; determining requirements for applying the available programs to the one or more nodes and displaying the requirements to the user for selection; receiving user selections from the displayed requirements; and executing the requirements to configure the one or more nodes

DESCRIPTION OF THE DRAWINGS

The detailed description will refer to the following drawings in which like numerals refer to like items, and in which.

DETAILED DESCRIPTION

Figure 1:
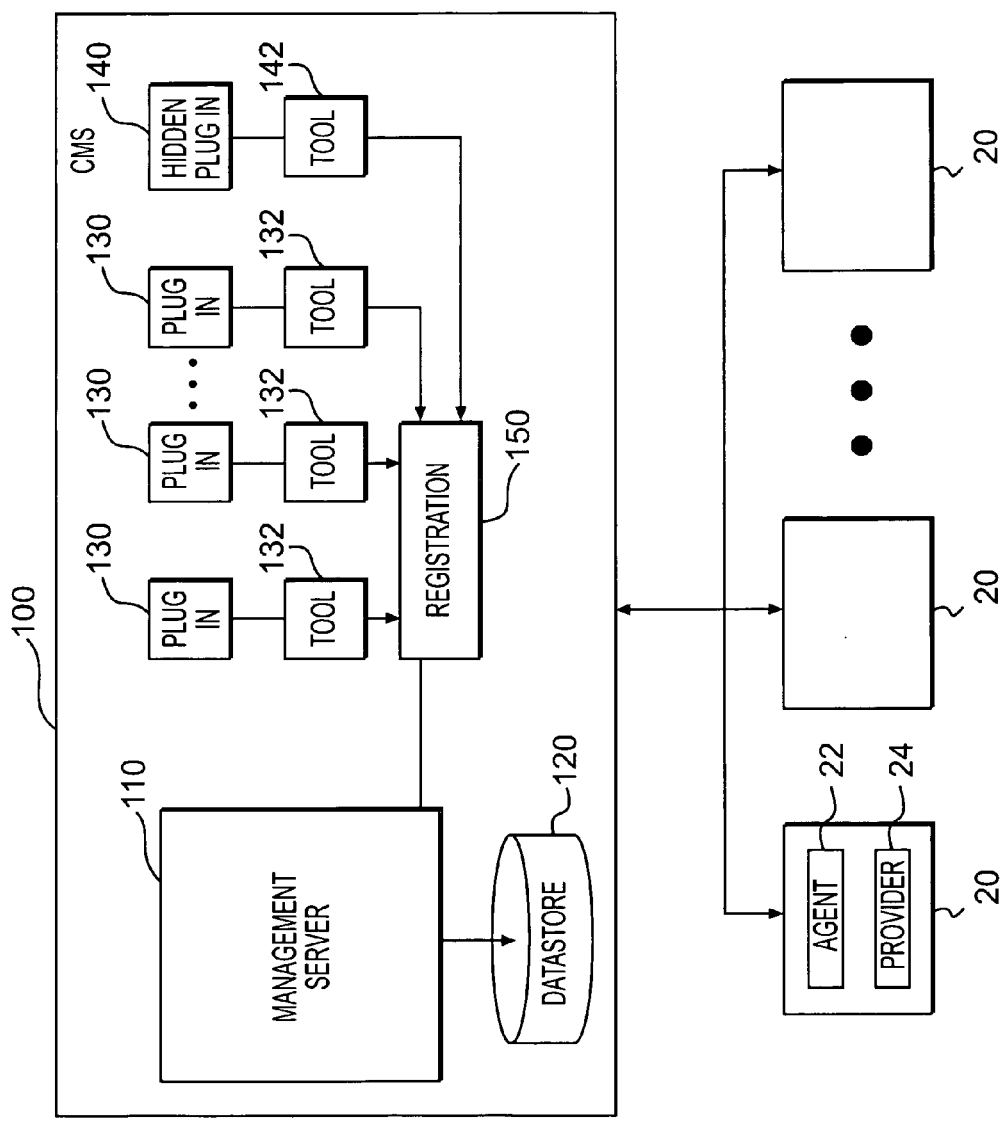
FIG. 1 is a block diagram of a computing system environment in which an exemplary configuration management system is implemented, and which specifies and controls the configuration of the computing system based on a user's intent.

FIG. 1 is a block diagram of a computer system environment in which an exemplary configuration management system is implemented, and which specifies and controls the configuration of the computer system based on a user's intent. The configuration management system operates so as to eliminate configuration complexity, cognitive burden on the user, and configuration errors resulting from manual implementation. Indeed, rather than requiring manual configuration of individual plug-ins, plug-in by plug-in, with the added complexity of completing all the specific steps each plug-in configuration requires and performing these steps in the proper order, the configuration management system performs this configuration. The configuration management system also reduces configuration time relative to a manual implementation.

In FIG. 1, computer system 10 (e.g., a networked computer system) includes a number of managed entities 20 or nodes. A configuration management system (CMS) 100 maintains a configuration state of the system 10. The CMS 100 includes a management server 110. Datastore 120 is coupled to CMS 100. The datastore 120 stores' a current version of the configuration state of the computer system 10. Also included in the CMS 100 are plug-ins 130 and hidden plug-ins 140, along with their respective tools 132, 142, which together form a part of the management software used by the CMS 100. Finally, the CMS 100 includes registration module 150. The functions and structures of these components of the CMS 100 will be explained later in detail.

Managed nodes 20 are systems such as a stand alone server, a hypervisor, a virtual machine, an operating system, a blade, a processor, a cluster, or any other component of an information technology (IT) infrastructure. The managed nodes 20 may include agents 22 that interface with the CMS 100 as will be explained below. The agents 22 may be natively present on the node 20 or may have been added to the managed node 20 by the CMS 100. The managed nodes 20 also may include a native provider 24. Examples of native providers are wbem providers, which typically exist on most systems, SNMP agents, and processors that have natively installed instrumentation that can be used through wbem, http, or https protocols. Use of the agents 22 and providers 24 with the CMS 100 allows the CMS 100 to retrieve information related to the node 20, directly from the node. Such information includes node identification and name, and node features (processors, memory, software installed, CPU utilization, applications active or inactive on the node), and other information needed to manage, configure, and maintain the nodes 20. This information may be obtained as part of an initial discovery process, and may be obtained subsequently as part of an ongoing configuration management process.

The datastore 120 is used by the management server 110 to track use of and to control management software (the plug-ins 130, 140) and to track and control all of the managed nodes 20. In an embodiment, the datastore 120 includes a directory (not shown) that stores information related to each of the plug-ins 130, 140. Such data may be in the form of an XML file, for example. The datastore 120 also includes license information and mapping between the licenses, the management software, and the managed nodes 20.

In the computer system 10, for each managed node 20, a user (human) may be presented with a menu of applicable management software programs (i.e., the plug-ins) that may be used to configure and operate the node 20. The management software has certain capabilities and features, and provides specific functions when installed in the CMS 100 and on the nodes 20. For each software product, the menu may list that program's specific functions, features, and capabilities. The user may select specific functions, features, and capabilities from the menu. For example, the menu may list as a software program a virtual server application that allows virtualization of various processing resources located at one or more of the nodes 20. The menu display for the virtual server application also may list various options for its installation in the computer system 10.

The user's menu selections (which also may come from pre-populated or user-specified defaults) are saved in the datastore 120. The CMS 100 may run a discovery process to determine the characteristics of the underlying hardware and software of the entities 20 and determines what program configurations are possible and what the requirements are that correspond to those possible configurations. The CMS 100 evaluates a current configuration of management software comprising the CMS 100 and the managed entities 20. Based on user-intended capabilities for a given node, the dependencies for those capabilities, the configuration of the management software, and the configuration of the managed system, the CMS 100 determines which licenses are needed, what management software must be installed on the managed entity 20 and in the CMS 100 itself, what is the minimum supported firmware necessary for enabling a plug-in and whether the managed entity 20 has the minimum firmware necessary installed, what configuration changes are required to the management software, and the order, or sequence for executing these changes. The proposed changes then may be presented to the user, who has several choices: 1) perform the listed steps manually, 2) allow the CMS 100 to implement the steps automatically for the entire system 10, and 3) allow the CMS 100 to automatically perform steps for a single node 20 or a set of nodes.

The CMS 100 initially need not store any information about the underlying computer system 10 that is to be configured and managed. Instead, the CMS 100 includes management software (plug-ins 130, 140) that can be used in conjunction with the managed nodes 20 to provide functionality corresponding to the user's intent for maintaining, configuring, and operating the computer system 10. As noted above, plug-ins, and their associated tools 132, 142, may be software programs that provide specific functions or capabilities such as capacity planning, workload management, power management, disaster recovery, and service deployments. The plug-ins provide the specific code, tools, and descriptive information that allows the plug-ins to integrate with the management server 110. Plug-ins 130 are software programs that a user purchases or otherwise acquires directly. In contrast, a hidden plug-in 140 may not be purchased directly, but may be supplied with other software or a hardware product. Hidden plug-ins 140 normally are not seen by the user. An example of a hidden plug-in is a performance data collection program. However, just because a user may not directly access the hidden plug-ins 140 does not mean the hidden plug-ins are invisible to other programs and applications. In fact, some programs need access to the hidden plug-ins 140, so instead of exposing the user to the hidden plug-in 140, the plug-ins 140 are hidden within other software programs. Using hidden plug-ins 140 allows multiple plug-ins to share a set of functionality. For example, if two plug-ins require SNMP to be set up, a new hidden plug-in 140 can be developed and shared between the two plug-ins. In this way, software behaves more consistently and efficiently when SNMP is required because only the hidden plug-in (i.e., a single plug-in) 140 is checking for and configuring SNMP. Additionally, the user is not bothered with this implementation detail because the plug-in is hidden.

The registration module 150 allows the plug-ins 130, 140 to register their tools 132, 142 with the management server 110. In an embodiment, the registration process involves defining the capabilities of each plug-in 130, 140 in an XML file associated with the plug-in, and then loading the XML file into a directory. Once loaded into the directory, the capabilities of the plug-in can be detected automatically by other components of the CMS 100.

Figure 2:
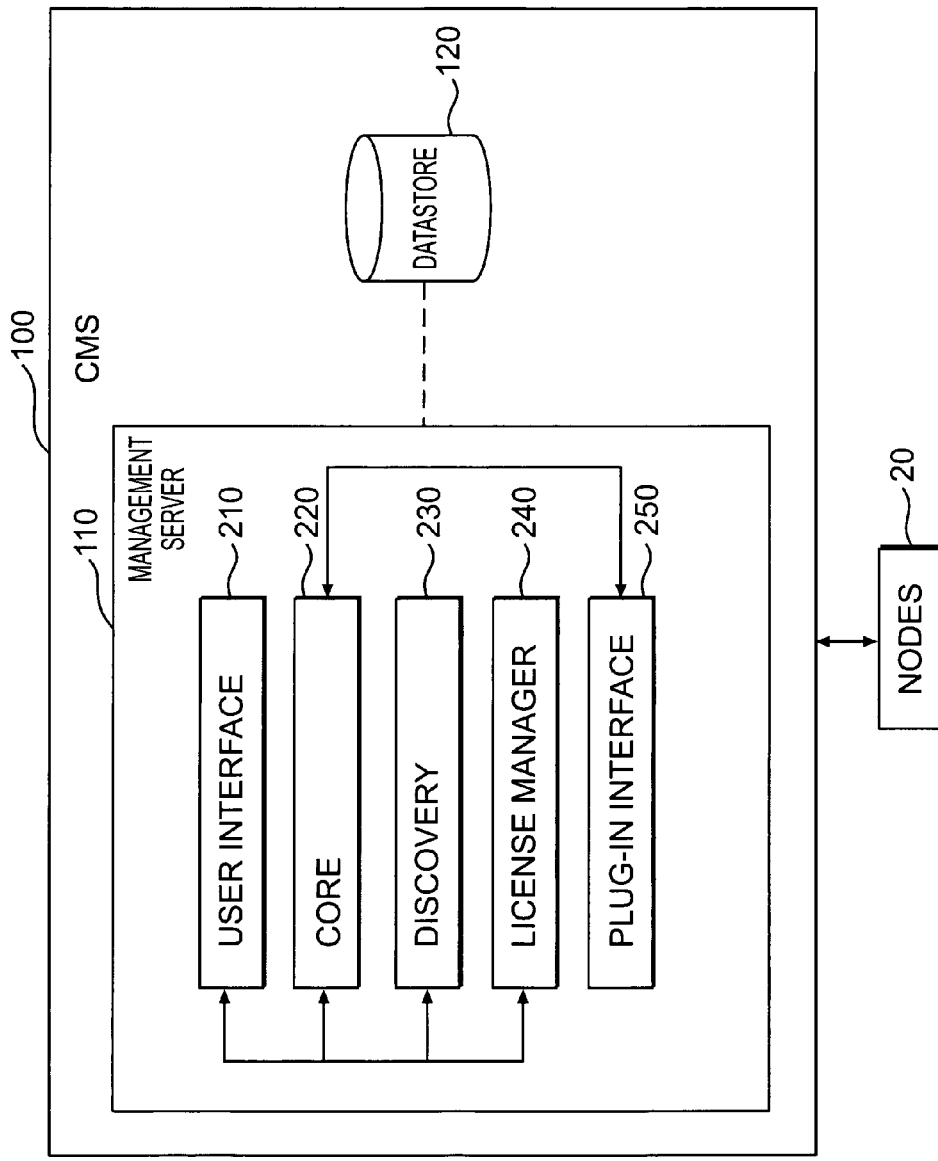
FIG. 2 is a block diagram of the exemplary configuration management system (CMS)

FIG. 2 is a block diagram of the exemplary management server 110 showing its various sub-components. The management server 110 includes a user interface 210, core 220, discovery module 230, license manager 240, and plug-in interface 250. The user interface 210 and the core 220 will be described in more detail with respect to FIG. 3.

The discovery module 230 is used in conjunction with native agents 22 and native providers 24 in the nodes 20 to detect the nodes 20 and to determine characteristics of the nodes 20 when initially assessing the system 10. Subsequent assessments of the system 10 may use agents installed in the nodes 20 as part of an initial or update configuration process.

The license manager 240 maintains a view of all licenses associated with various plug-ins as those plug-ins register with the management server 110 using the registration module 150. Thus, the license manager can determine, based on the user's specified intent, which licenses are required to be invoked as the various plug-ins are assigned to the different nodes 20.

The plug-in interface 250 provides access to various features and capabilities of the plug-ins 130, 140 through a plug-in infrastructure, as will be described later in more detail and with respect to FIG. 4.

Figure 3:
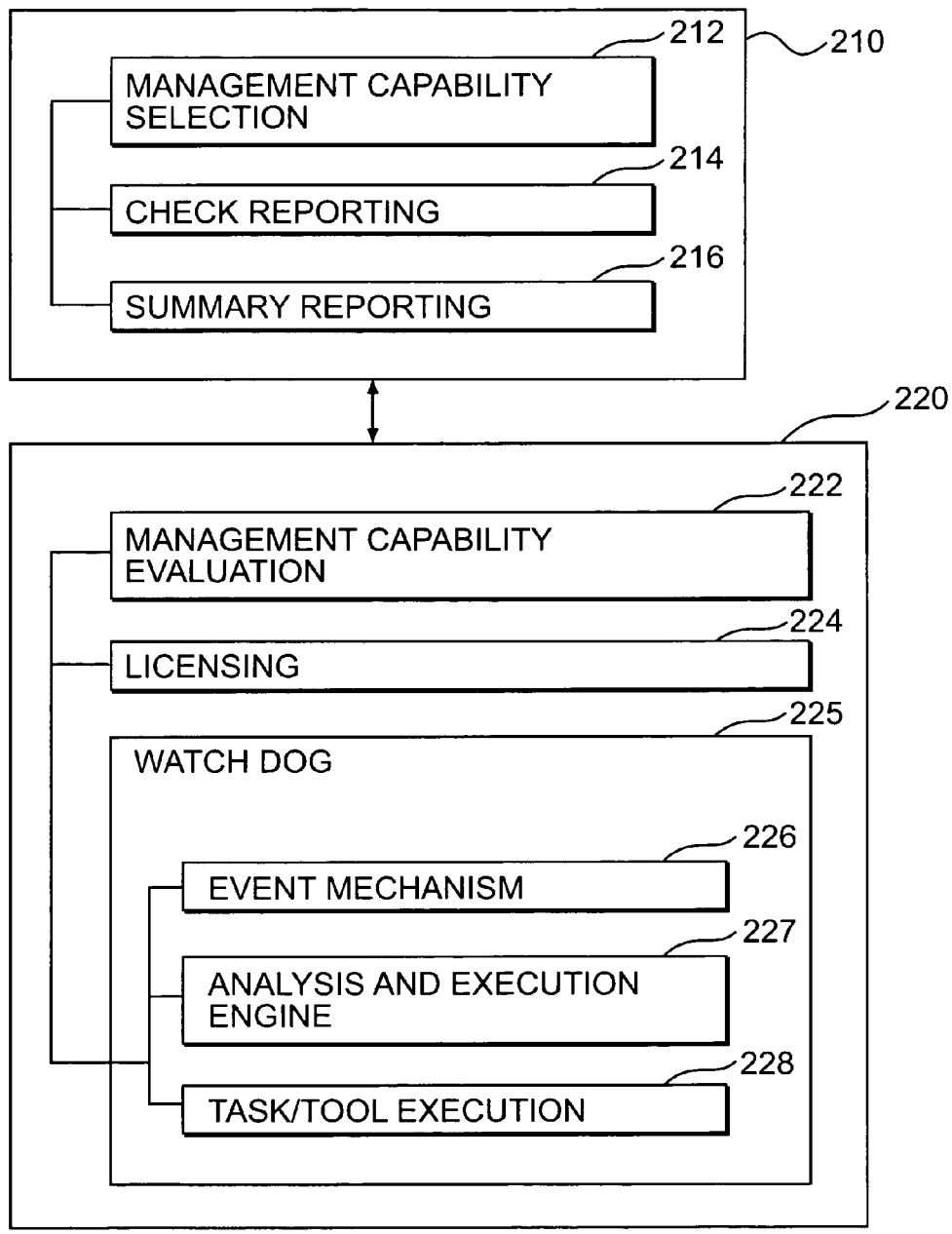
FIG. 3 is a block diagram of an exemplary core and user interface of the CMS of FIG. 2.

FIG. 3 is a block diagram of an exemplary core 220 and user interface 210. The user interface 210 includes a management capability module 212, a check reporting module 214, and a summary reporting module 216. The management capability module 212 allows a user to specify and select management capabilities; i.e., to specify the user's intent. The user may specify intent by first selecting a group of nodes 20 to be managed. The user interface 210 may display a configuration page where the user is prompted to provide system credentials, such as data required to verify licenses, hardware and software configurations, and other information needed to configure and manage the nodes. All or part of this information also may be determined through an optional discovery process.

The user interface 210 then displays a list of management capabilities (i.e., the plug-ins, and their functions/options) that are appropriate for the group of nodes. The list of plug-ins may indicate that some plug-ins are appropriate for specific nodes of the group of nodes, and not other nodes. The user then may "check the box" to indicate which of the plug-ins to apply to the group of nodes. Note that dependent plug-ins automatically are selected. For example, when plug-in A depends on plug-in B, selecting the checkbox for plug-in A will cause plug-in B to be selected automatically. This automatic selection process among dependent plug-ins is implemented by plug-ins defining dependencies in the tool registration process. Alternatively, the user interface 210 may present the user with a matrix of systems (nodes 20) versus capabilities (plug-ins 130, 140) that indicates which plug-ins are appropriate for which nodes. The user then may select which specific plug-ins to apply to each of the nodes 20.

The check reporting module 214 analyzes the current state of the computer system 10 and determines what actions are required to make the configuration of the computer system 10 comply with the user's intent.

The summary reporting module 216 provides a summary display of the current system configuration, the selected plug-ins and their tools and functions, the licenses required to reconfigure the system according to the user's intent, and the required action steps, and their sequence to reconfigure the system. The summary display also allows the user to confirm the user's intent, to accept some or all of the suggested action steps, and to direct the CMS 100 to execute some or all of the suggested steps.

The core 220 essentially is the driver that allows the analysis, display, and selection functions shown on the interface 210. The core 220 includes a management capability evaluation module 222 and a licensing module 224. The core 220 also includes an optional watchdog module 225. The watchdog module 225 includes, in turn, an event mechanism module 226, and analysis and execution engine 227, and a task/tool execution engine 228.

The management capability module 222 provides the processing and data access needed to analyze the current state of the computer system 10, determine what plug-ins are available to participate in a reconfiguration of the computer system 10, provide suggestions for such reconfiguration, display this information to the user, and receive and act on the user's commands. The module 222 determines which tools 132, 142 should be run to analyze the computer system 10, what agents, if any need be installed at the nodes 20, and what configurations steps, and their sequence, should be executed. Finally, the module 22, in coordination with the licensing module, determines license requirements for the new configuration of the computer system 10.

The licensing module 224 is used with the management capability module 224 to determine what licenses exist in the current state of the computer system 10 and to determine, based on the user's intent, what license changes will be required and which license are available, and provides an input to the module 222. The module 224 may use information entered on an options page of the user interface 210, as well as management capabilities and determine these license requirements. The options page may allow (or prompt) the user to specify license features, view existing and installed licenses, licenses in use, and remaining licenses.

The watchdog module 225, when implemented, is used to periodically monitor the computer system 10 to confirm that the system configuration continues to comply with the user's intent. The watchdog module 225 may use native agents and providers at the nodes 20, and/or may use agents installed as part of a computer system configuration/reconfiguration.

The event mechanism 226 monitors operations on the computer system 10 and determines if and when an event occurs that can affect the system configuration. For example, a new hardware device may be plugged in to one of the nodes 20.

The analysis and execution engine 227 determines which tools 132, 142 should be run on the nodes 20 and then directs the task/tool execution engine 228 to execute these tools. The analysis and execution engine 227 operates based on the tools registration process with the registration module 150. All dependencies and tools are based on the registration process controlled by the module 150, and the analysis and execution engine 227 applies its logic to execute the appropriate tools 132 and 142 at the appropriate nodes 20.

Figure 4:
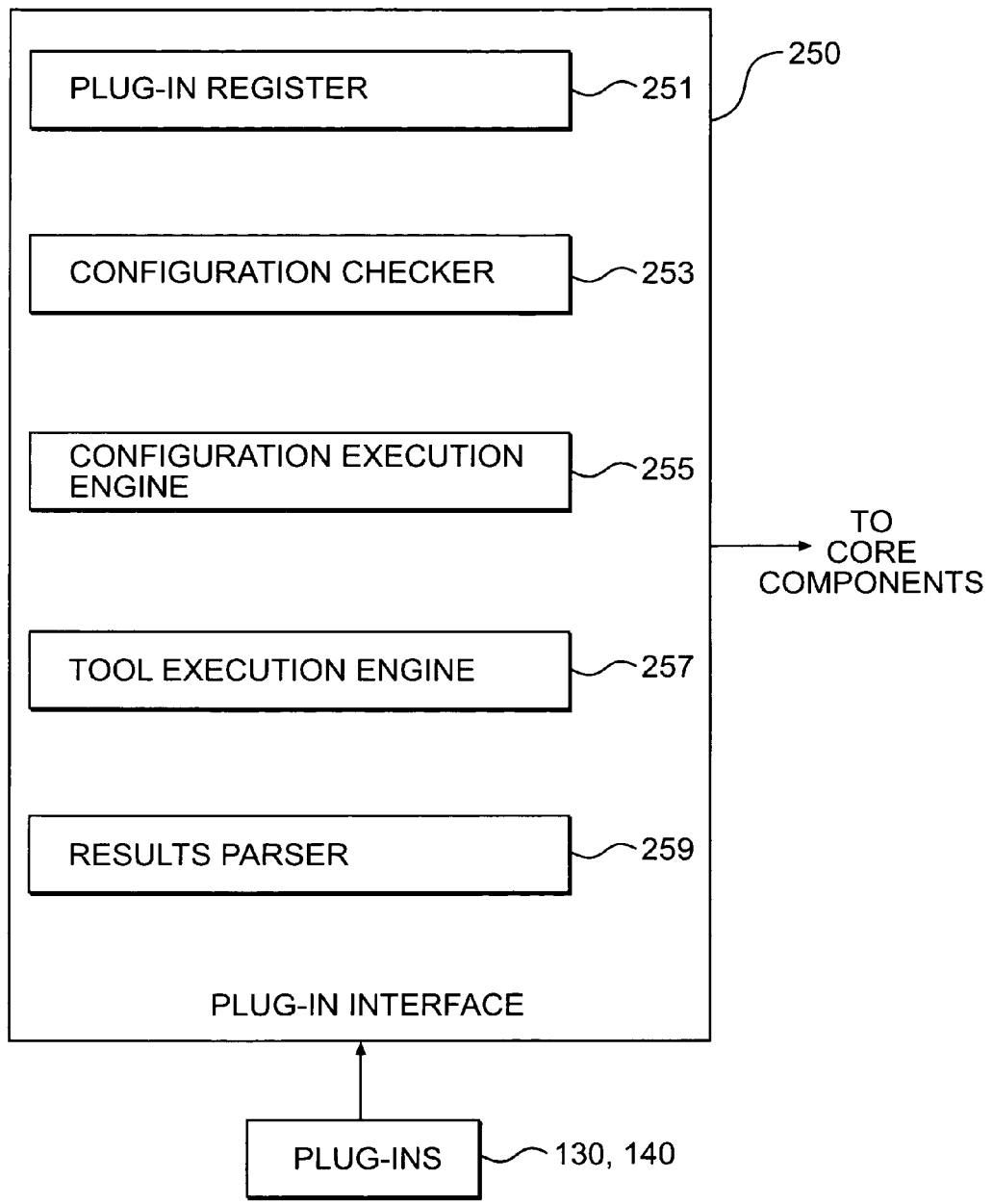
FIG. 4 is a block diagram of an exemplary plug-in interface used with the CMS of FIG. 2.

FIG. 4 shows the plug-in interface 250, which includes plug-in register 251, configuration checker 253, configuration execution engine 255, tool execution engine 257, and results parser 259. The plug-in register 251 is used by the CMS 100 to register plug-ins with the management server 110, where the registration includes loading a XML file into a directory. The XML file identifies the plug-in and includes the plug-in's features and functions. The XML file includes specifications as to which types of nodes 20 the plug-in applies. The XML file also contains licensing requirements and dependencies. The XML files specifies ordering of plug-ins. The XML file includes directives, for executing tools at appropriate phases of the configuration process. With these features and functions loaded onto the directory as an XML file, the core 220 can parse the various features and functions of all the plug-ins and present the applicable features and functions to the user by way of the user interface 210.

The configuration checker 253 and the configuration execution engine 255 work in tandem to check the proposed configuration against the user's intent and then to execute the proposed configuration changes as directed by the user. This configuration checking and execution may involve deploying instrumentation (e.g., agents) so that the core 220 can interact remotely with the managed nodes 20 to query the nodes and to reconfigure the nodes.

The configuration execution engine 255 passes data gathering and configuration commands to the tool execution engine 257 because all plug-ins are designed for implementation as tools and are either executed on the CMS 100 itself or are executed on the managed nodes 20.

The results parser 259 reads the results of the tools executed and outputs an XML file of the results. The output XML file may be parsed so that the management server 110, and ultimately the user, can see the name of the plug-in, details of plug-in (i.e., features and functions), and any error messages.

Figure 5:
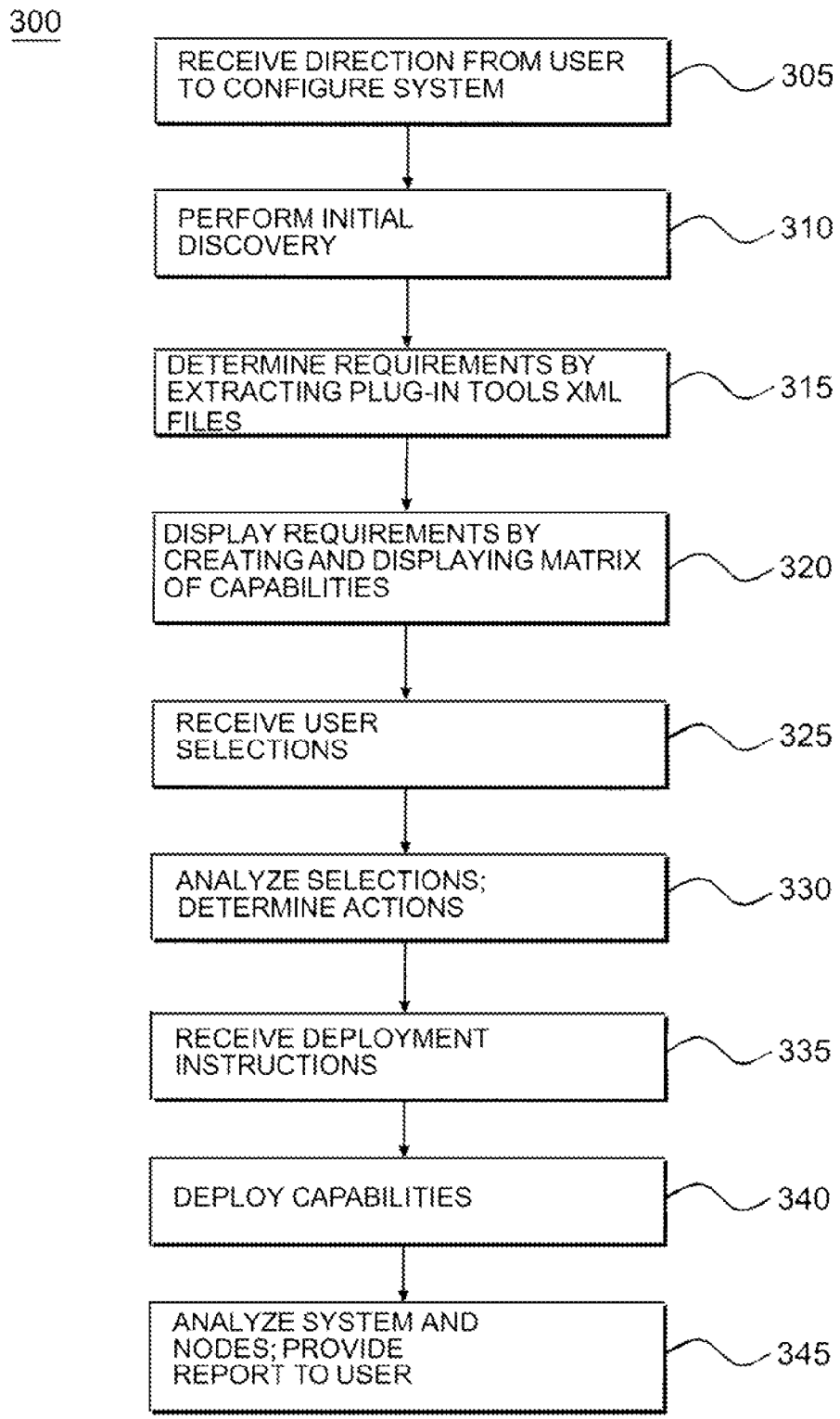
FIG. 5 is a flowchart illustrating an exemplary discovery, analysis, and configuration operation using the CMS of FIG. 2.

FIG. 5 is a flowchart illustrating exemplary discovery, analysis, and execution operation 300 of the CMS 100 of FIG. 2. In block 305, the CMS 100 receives directions from a user to configure or reconfigure all or a part of the computer system 10, and receives with the directions, the identification of the nodes 20 to be reconfigured, as well as the CMS 100 itself, if applicable. In optional block 310, the CMS 100 performs a discovery operation to determine the current configuration of the computer system 10. The discovery operation may use native instrumentation at one or more of the managed nodes 20. Alternatively, or in addition, the CMS 100 may prompt the user, by way of the user interface 210, to enter certain information into the CMS 100 regarding one or more of the managed nodes 20. The CMS 100 then may use this entered information, or may deploy one or more agents, with the concurrence of the user, to collect additional information from any of the managed nodes 20. If the discovery operation is not executed, the CMS 100 may instead rely on system information already existing in the datastore 120.

In block 315, the management server 110 extracts plug-in tool information from XML files stored in the datastore 120. In block 320, the core 220 working with the interface 210 formats and displays current system configuration, suggested configuration changes, including addition, modification or deletion of plug-ins in the context of the managed nodes, any license requirements for the suggested configuration, and the action steps, and the sequence of their execution. The display may be on a per node basis, for a group of similar nodes, or in the form of a matrix.

In block 325, the management server 110 receives the user's selections, which may be to accept all changes, a portion of the changes, or none of the changes. In block 330, the core 220 analyzes the user's selections and determines what actions are required to comply with the user's intent. Note that if only some of the changes are accepted, the management server 110 may rerun the configuration analysis to confirm that the accepted changes still are possible, and to verify the action steps and their sequence of execution.

In block 335, the core 220 receives deployment and reconfiguration commands from the user, and in turn, issues deployment and execution commands through the tools interface 250. In block 340, the management server 110 deploys the selected capabilities, reconfiguring the computer system 10 as appropriate. In block 345, the CMS 100 monitors the computer system 10 analyzing all nodes 20, and formats a report for presentation to the user by way of the user interface 210. The operation 300 then ends.

We claim:

1. A method for configuring nodes in a computer system comprising one or more nodes according to a user's intent, comprising:
   utilizing a processor to execute instructions on a non-transitory computer readable medium for:
   analyzing a configuration command received from a user reflective of a user's intended configuration of one or more nodes of a computer system, wherein the configuration command includes a number of user selected software capabilities defined via a registration process;
   determining available programs for configuring the one or more nodes;
   determining requirements for applying the available programs to the one or more nodes and displaying the requirements to the user for selection, where the determined requirements include a license associated with a plug-in required to reconfigure one or more nodes of the computing system to the user's intended configuration;
   analyzing received user selections from the displayed requirements; and
   executing the requirements to configure the one or more nodes.

2. The method of claim 1, wherein determining the requirements comprises analyzing the available programs to determine:
   configuration action steps; and
   a sequence for executing the configuration action steps.

3. The method of claim 1, further comprising analyzing the user selection to confirm the determined requirements.

4. The method of claim 1, further comprising:
   receiving a deployment and execution command from the user; and
   deploying and executing the programs to configure the computer system.

5. The method of claim 1, further comprising determining additional programs to be acquired by the user in order to configure the computer system according to the user's intent.

6. The method of claim 1, further comprising monitoring the computer system after configuration in order to confirm adherence to the user's intended configuration.

7. The method of claim 1, further comprising performing an initial discovery of the one or more nodes.

8. The method of claim 7, wherein performing an initial discovery comprises retrieving information from one or more of the nodes, the information gathered by programs native to the one or more nodes.

9. The method of claim 8, further comprising prompting the user to specify credential information related to one or more of the nodes.

10. A system for configuring a computer system according to a user's intent comprising:
    a memory;
    a processor coupled to the memory; and
    a set of instructions stored on the memory, wherein the processor executes the instructions to:
    analyze a configuration command received from a user reflective of a user's intended configuration of a computer system, including an identification of one or more of the nodes to be configured, wherein the configuration command includes a number of user selected software capabilities defined via a registration process;
    determine available programs for configuring the one or more nodes;
    determine requirements for applying the available programs to the one or more nodes and displaying the requirements to the user for selection, where the determined requirements include a license associated with a plug-in required to reconfigure the computing system to the user's intended configuration;
    analyze received user selections from the displayed requirements; and
    execute the requirements to configure the one or more nodes.

11. The system of claim 10, wherein the instructions to determine the requirements include instructions to analyze the available programs to determine:
    configuration action steps; and
    a sequence for executing the configuration action steps.

12. The system of claim 10, wherein the processor executes the instructions to analyze the user selection to confirm the determined requirements.

13. The system of claim 10, wherein the processor executes the instructions to:
    receive a deployment and execution command from the user; and
    deploy and execute the programs to configure the computer system.

14. The system of claim 10, wherein the processor executes the instructions to determine additional programs to be acquired by the user in order to configure the computer system according to the user's intent.

15. The system of claim 10, wherein the processor executes the instructions to monitor the computer system after configuration in order to confirm adherence to the user's intended configuration.

16. The system of claim 10, wherein the processor executes the instructions to perform an initial discovery of the one or more nodes.

17. The system of claim 16, wherein the instructions to perform the initial discovery include instructions to retrieve information from one or more of the nodes, the information gathered by programs native to the one or more nodes.

18. The system of claim 17, wherein the processor executes the instructions to prompt the user to specify credential information related to one or more of the nodes.

19. A method for configuring a computer system having a plurality of configurable nodes and a configurable central monitoring system, comprising:
    utilizing a processor to execute instructions on a non-transitory computer readable medium for:
    determining a user's intended configuration of the computer system, wherein the intended configuration includes a number of user selected software capabilities defined via a registration process;
    analyzing the intended configuration to determine requirements for configuring the computer system according to the user's intended configuration, where the determined requirements include a license associated with a plug-in required to reconfigure the computing system to the user's intended configuration;
presenting the determined requirements to a user;
receiving a configuration command from the user; and
configuring the computer system according to the configuration command.

20. The method of claim 19, wherein determining the requirements comprises analyzing available programs to determine:
configuration action steps; and
a sequence for executing the configuration action steps.

* * * * *